US010679206B2

(12) United States Patent
Laracey et al.

(10) Patent No.: US 10,679,206 B2
(45) Date of Patent: Jun. 9, 2020

(54) LOCALIZED IDENTIFIER BROADCASTS TO ALERT USERS OF AVAILABLE PROCESSES AND RETRIEVE ONLINE SERVER DATA

(71) Applicant: PAYPAL, INC., San Jose, CA (US)

(72) Inventors: Kevin Laracey, San Jose, CA (US); Ryan Christopher May, Elizabeth Bay (AU)

(73) Assignee: PAYPAL, INC., San Jose, CA (US)

( * ) Notice: Subject to any disclaimer, the term of this patent is extended or adjusted under 35 U.S.C. 154(b) by 782 days.

(21) Appl. No.: 15/199,427

(22) Filed: Jun. 30, 2016

(65) Prior Publication Data

US 2018/0005220 A1    Jan. 4, 2018

(51) Int. Cl.
*G06Q 40/00* (2012.01)
*G06Q 20/32* (2012.01)
*G06Q 20/36* (2012.01)
*H04W 4/80* (2018.01)

(52) U.S. Cl.
CPC ....... *G06Q 20/327* (2013.01); *G06Q 20/3224* (2013.01); *G06Q 20/3278* (2013.01); *G06Q 20/36* (2013.01); *H04W 4/80* (2018.02)

(58) Field of Classification Search
CPC .................................................... G06Q 20/327
USPC ...................................................... 705/40, 35
See application file for complete search history.

(56) References Cited

U.S. PATENT DOCUMENTS

| | | | |
|---|---|---|---|
| 2012/0089509 A1* | 4/2012 | Kasriel | G06Q 20/102 |
| | | | 705/40 |
| 2012/0130895 A1 | 5/2012 | Granbery et al. | |
| 2014/0279101 A1* | 9/2014 | Duplan | G06Q 20/3224 |
| | | | 705/18 |
| 2016/0055538 A1 | 2/2016 | Todasco | |
| 2016/0078421 A1 | 3/2016 | Barragán Treviño et al. | |
| 2016/0171486 A1 | 6/2016 | Wagner et al. | |
| 2016/0373929 A1* | 12/2016 | Stirling | H04W 4/021 |

OTHER PUBLICATIONS

Journal of Engineering; "Patents; Patent Application Titled: Financial Payment systems linked to customer Accounts"; Jul. 2014, Atlanta. (Year: 2014).*

* cited by examiner

*Primary Examiner* — Edward Chang
(74) *Attorney, Agent, or Firm* — Haynes and Boone, LLP

(57) ABSTRACT

There are provided systems and methods for localized identifier broadcasts to alert users of available processes and retrieve online server data. A user may visit a merchant location and engage in a transaction to purchase items from a merchant at the merchant location. The merchant may wish to alert the user of various payment methods, include payments through a payment application of the user's device using a received identifier for retrieval of an online invoice with a service provider. The merchant may utilize a merchant device to broadcast a location awareness identifier to alert the user of availability of payment processes with the service provider. Additionally, once the online invoice is generated for a transaction, the merchant device may broadcast a payment terminal request identifier that allows the user to retrieve the online invoice using data associated with the identifier and a location for the merchant.

20 Claims, 7 Drawing Sheets

Interface
1000

Protype Wallet
Manage Balance  $59.72>
              available
Manage Credit
Use Activity              >
Macy's Men    $106.00
Target        $167.11
Apple Store   $3.74
VIEW ALL Interface
1002

Protype Wallet
Manage Balance  $59.72>
              available
Manage Credit
Use
  Do you want to pay?
  US Merchant 343 216
Target        $167.11
Apple Store   $3.74
VIEW ALL Interface
1004

5. Pay Invoice with Tab as usual.

AT&T                    Back
US Merchant
Monday, 3/2/15
Coke (Can)         $1.16
Grilled Cheese     $6.89
Total              $8.05
Payment Options
Tip
None  $5  $7  $9
            PAY 200a 4. Application Creates a Tab for location and is given the URL to Open.

1. When Application is Open It Starts Ranging for Payment Terminal UUID.

2. If a beacons found: The Application receives Major and Minor Values.

3a. If location found and (distance <2 & distance>0.1) We ask user if they are trying to pay now.

3b. If (distance <0.1) we simulate a tap by skipping the prompt and going straight to opening a tab and opening the web view.

LOCALIZED IDENTIFIER BROADCASTS TO ALERT USERS OF AVAILABLE PROCESSES AND RETRIEVE ONLINE SERVER DATA

TECHNICAL FIELD

The present application generally relates to short range wireless communication of identifiers and electronic payment mechanisms and more specifically to localized identifier broadcasts to alert users of available processes and retrieve online server data.

BACKGROUND

Merchants may offer sales of items at physical merchant locations, where users may browse and/or select items for purchase and engage in transactions with the merchant. In this regard, the merchant may utilize one or more checkout and payment processes for payment processing of transactions with users. Certain payment processes may include payments made through an application executing on a device for a user, such as payments utilizing an online transaction manager and/or payment provider. However, users may be unaware that the merchant accepts such payment processes or funding sources. Moreover, where the user only finds that the merchant accepts payments through the online transaction manager and/or payment provider when the user is in the middle of checkout or at a time for payment, a setup process to activate the application of the user's device, establish the transaction, and process a payment may be too time consuming or difficult for the user to choose the electronic payment processing over another payment type. Thus, users may opt out using the electronic payment process for a transaction where the process become too laborious or time consuming during checkout.

Figure 1:
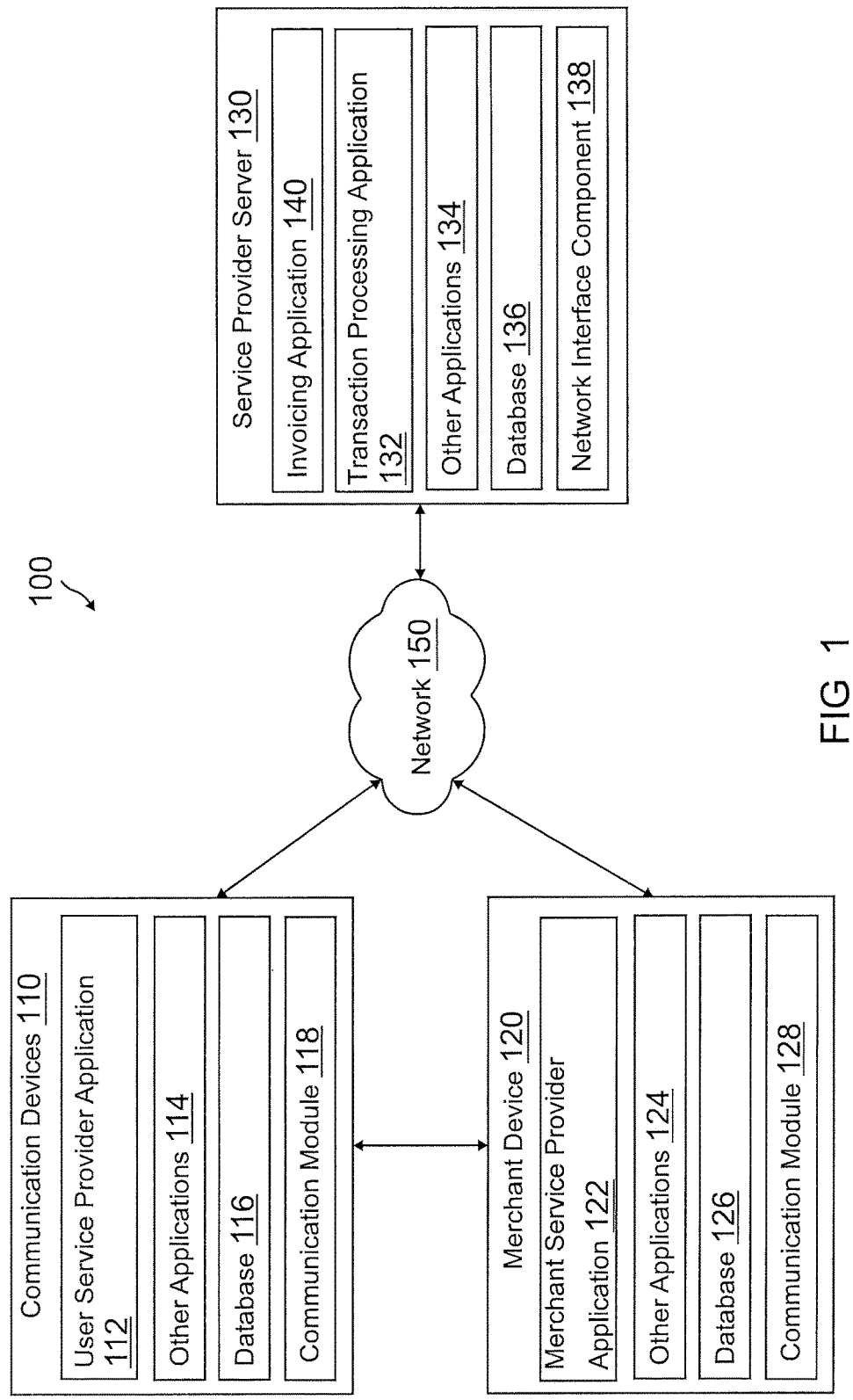
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for localized identifier broadcasts to alert users of available processes and retrieve online server data. Systems suitable for practicing methods of the present disclosure are also provided.

An online service provider, such as a service provider offering payment processing, monetary transfer, and other financial services to merchants, consumers, and other users, may be utilized by a merchant for electronic transaction and payment processing at various physical locations for the merchant, such as retail stores, mobile merchant locations, food establishments, concessions, and other merchant locations. The service provider may further include additional transaction management services, which may include invoicing and invoice monitoring, as well as provision of electronic processing applications and website and account services. Accounts with the service provider may correspond to payment accounts, where a holder of the account may send and receive payments and otherwise engage in financial transactions. Payment accounts may include personal and financial information, as well as other information that may be determined or requested from the user or merchant. Additionally, the user may specify authentication credentials, such as a login name, password, and/or personal identification number (PIN) for use of the payment account.

Payment accounts may be accessible through one or more websites associated with the service provider, which may include merchant websites incorporating payment provider processes, codes, or other available service provider features. Moreover, the payment accounts may be accessible through a dedicated application of the service provider (and/or merchant, where the merchant's application includes processes, code, etc., to incorporate the service provider's features). In this regard, dedicated applications may execute on a device of the user and/or merchant, such as communications device including mobile smart phones, tablet computers, desktop computers, point-of-sale (POS) devices, or other computing devices. Thus, the service provider may be accessible for transaction and payment processing through a web browser application accessing a website of the service provider and/or a dedicated application accessing one or more application programming interfaces (APIs) for the service provider over a network.

Additionally, merchant and user devices may include various payment processing components that may be used when processing payments with another device. Such payment processing components may include a communication module to provide short range wireless communications (e.g., Bluetooth Low Energy (BLE), Bluetooth, near field communications (NFC), WiFi, LTE Direct, radio, infrared, etc.) with another, for example, to effectuate a check-in and/or provide/receive an identifier (ID), such as a Universally Unique Identifier (UUID) or other token (e.g., a name, address, device ID, user ID, email address, etc.). Other processing components may include an output display to display a barcode or QR code (e.g., having encoded information in the barcode or QR code, which may be encoded into the QR code or barcode by the payment application or the payment provider) and/or a GPS locator to associate the geo-location of the user and/or merchant. A non-transitory memory may further store data for use in payment processing, including held IDs, locations, received IDs, transaction information, digital wallet information and/or tokens, payment instrument information and/or tokens, authentication information, or other necessary data.

The service provider may provide and/or utilize one or more types of payment instruments to a user (e.g., a consumer and/or a user in a digital transfer of funds) through a digital wallet accessible using the application of the user's communication device, which may be utilized by the user to pay for and complete a transaction with a merchant. Types of payment instruments may include payment accounts with the payment provider, financial accounts with other financial institutions, credit/debit cards, gift cards, and other types of funding sources. The service provider may utilize a cloud computing architecture to provide the digital wallet in a cloud computing model (e.g., through networked servers and devices) to the user. In this regard, payment instruments and/or digital wallets may be identified through one or more tokens stored to the user's communication device. Such tokens may be utilized during electronic transactions with a merchant by providing the tokens to the merchant and/or service provider during a transaction, where the service provider may select a payment instrument (e.g., one available in the digital wallet or specified in the token) for transaction processing, or allow the user to authenticate for use for the account/digital wallet and select a payment instrument for use during transaction processing. In further embodiments, the application executing on the user's computing device may allow for the user to authenticate upfront, find/enter a transaction, and allow the user to provide a payment instrument, such as through selection of stored payment instruments and/or entry of a new payment instrument.

Thus, a user may visit a merchant location and wish to engage in a transaction with the merchant to purchase one or more items selected at the merchant location. The user may bring the selected item(s) to a checkout location where the user is required to provide payment for the item(s). In this regard, both the user and the merchant may wish to utilize electronic transaction and payment processing through the online service provider using applications executing on the user's communication device and the merchant's device (e.g., a tablet/desktop computer, mobile device, POS device, etc.). In order to facilitate transaction processing, a UUID may be determined by the merchant device that may include information (e.g., bits, associated data, or other portions) that allow the communication device for the user to identify an online invoice generated for a transaction between the user and the merchant. In order to provide this UUID, the merchant may first enter input to the merchant device for the transaction, such as items in the transaction, cost, tax, tip, and/or any other transaction information. The merchant device may receive the user input through an application and may proceed with entering the user input into a generated transaction in one or more interfaces of the application. Thus, the merchant device may include one or more graphical user interfaces (GUIs) that allow transaction generation within the application executing on the merchant device.

The application may further interface with the online service provider, for example, through one or more APIs of the online service provider, to cause generation of an online invoice for the transaction. The online invoice may correspond to a retrievable document, interface, webpage, or other online resource that includes the transaction information and allows for payment processing using the service provider, as will be discussed herein. For example, the online invoice may be associated with a Uniform Resource Locator (URL) or other Uniform Resource Identifier (URI) allowing retrieval of the online invoice by the communication device and display of the online invoice through a web browser, dedicated application, or other application executing on the communication device. For example, the online invoice may correspond to a payment portal for the online service provider where transactions can be processed. The online invoice may include the transaction and/or transaction information for display to the user through the communication device, and may include payment processes for payment of the online transaction. The online invoice may also be capable of being viewed and monitored by the merchant and/or payment provider in order to determine whether payment has been made for the transaction.

In order to generate a URL specific for the online invoice, the merchant device may determine a UUID (e.g., a Payment Terminal Request ID) having at least a randomized portion included/associated with or attached that is specific to the transaction. For example, using the iBeacon protocol, which utilizes Bluetooth Low Energy (BLE or Bluetooth Smart), a UUID may include a Major value and a Minor value. Each value may be randomized between a set amount of numbers (e.g., generally three each, although different protocols may allow for a larger or smaller set of numbers, characters, and/or symbols). In other embodiments, different UUIDs, protocols, and/or structures may be utilized, where at least a portion of the UUID is unique or randomized. Generally, a Major value may identify a genus of items, such as a grouping of wireless beacons and/or devices, while a Minor value may identify a species of such items, such as a specific beacon or device. However, the Major value and Minor value may also be randomized by the application executing on the merchant device, and thus may allow for specific transaction identification. For example, the merchant device may retrieve a stored UUID that identifies the merchant device and/or initiates a process to find an online transaction by a communication device. The merchant device may randomize the Major and Minor values associated with the UUID for the transaction generated between the user and the merchant based on the merchant's input to the application executing on the merchant device. The randomized Major and Minor values may be transmitted to the online service provider during online invoice generation. Additionally, the merchant may provide a location, such as a merchant location, GPS coordinates, or more general location (e.g., within a certain set area, such as a city, geo-fenced area, etc.).

The service provider may then proceed with online invoice generation, as discussed herein. When identifying the online invoice and/or generation or the URL for the online invoice, the service provider may identify the online invoice and/or URL (e.g., add to the URL) through the received Major and Minor values from the merchant device for the transaction. Where other unique or randomized portions are provided to the service provider, the service provider may generate/identify the online invoice and/or URL through the received unique or randomized portions. The service provider may further use the location of the transaction to further specify and identify the online invoice and/or URL. Once the online invoice and a URL allowing retrieval of the online invoice are generated, the URL is stored for use by the user's communication device. The URL may correspond to a URL allowing application retrieval of the online invoice by the communication device. In various embodiments, the URL and/or online invoice may be provided to the merchant device for review and/or monitoring.

The merchant device may then broadcast UUID, which may be broadcast at a first range or may be generally broadcast over a preset or furthest receivable range for the short range wireless communications utilized by the merchant device. The payment application on the user's communication device may be configured to "range" for received IDs (e.g., detect the UUIDs) over short range wireless communications within a specific range. The application or user device may be set to only receive IDs within a preset range or distance from the communication device (e.g., distance between the broadcasting device, the merchant device, and the receiving device, the communication device). For example, in order to limit the application executing on the communication device from picking up a plurality of UUIDs, which may not be the UUID associated with the transaction between this specific user and merchant, the application may only recognize a UUID that is transmitted within a certain proximity or distance from the communication device, for example, 30 centimeters, 1 foot, or other distance between the merchant device broadcasting the UUID and the communication device. If the application receives a UUID within this distance, the application may then query the user of whether the user is attempting to pay for the transaction. If the user responds yes (e.g., taps a confirmation button or otherwise enters confirmation), the application may initiate retrieval of the online invoice, as discussed herein. However, the user may also dismiss the notification and choose not to pay the transaction, for example, during faulty pickup of a UUID within the distance (e.g., a different user's transaction with the merchant or another merchant/user) or where the user wishes to change the transaction and/or payment process. Moreover, in order to mimic a tap type payment and acceptance process, for example, using near field communications (NFC), the application may further set another proximity of distance from the device, such as less than 1 centimeter between the merchant device broadcasting the UUID and the communication device, where the application may automatically confirm that the UUID belongs to a transaction between this specific user and merchant and automatically initiates the process to retrieve the online invoice. Thus, the application may present the UUID that provides identification of the merchant and allow the user to confirm that the UUID is associated with the transaction, or allow the user to bring, or "tap," the communication device to the merchant device to automatically accept the UUID as associated with a transaction the user would like to process.

In order to retrieve the online invoice, the application may determine (e.g., retrieve) at least a portion of the UUID for transmission to the online payment provider. The at least the portion of the UUID may correspond to the unique or randomized portion of the UUID generated for the online invoice by the merchant device. For example, the portion may correspond to the Major value and the Minor value for the UUID. The application may further determine a location for the user, which may correspond to the UUID and/or data associated with the UUID, a GPS location, a check-in by the user, or other location detection system. The Major and Minor values (or other unique/randomized UUID portion) and the location may be communicated to the online payment provider. The Major and Minor values and the location may be utilized by the online payment provider to identify the online invoice and retrieve the URL allowing access to the online invoice. The URL may then be communicated to the communication device of the user, where the application executing on the communication device may process the URL to retrieve the online invoice and present the online invoice to the user through one or more interfaces of the application. The user may then perform payment processing using the interfaces of the application to view, enter input, select payment processes, and confirm/decline payment processing for the transaction.

For example, various payment processes may be utilized in order to perform a payment for the transaction in the online invoice. The user may be required or provided the option to directly enter a payment instrument, such as a credit or debit card, which may be provided to the service provider (e.g., over a secure/encrypted communication channel). In other embodiments, the user may authenticate themselves for use of a payment account, which may include held funds and/or stored payment instruments capable of being selected and utilized for a transaction. The service provider may utilize held funds and/or process one or more selected payment instruments to provide a payment to the merchant. The online invoice may be updated once a payment is made, and the merchant may be updated (e.g., through a message/notification and/or through monitoring the invoice) to complete transaction processing.

In other embodiments, the user may utilize their communication device to transmit a token to the service provider for payment processing, as well as authentication and/or authorization where necessary. A token may correspond to an ID that identifies a user, a user account (e.g., a payment account with a service provider), a payment instrument, a digital wallet (e.g., a digital representation of one or more payment instruments, or other entity that may provide a payment to a merchant. For example, a token may include an email address, account name, or other data element that represents data to be used for payment processing. Thus, the token may be received by the service provider, which may identify a payment instrument selected by the user, request the user to select a payment instrument (e.g., stored to a digital wallet in the cloud), or automatically process the payment using a set or best (such as defined by the user or selected by the service provider based on the transaction) payment instrument in the digital wallet. The token may also be communicated through an encrypted or unencrypted data transmission between a device for the user and a device for the merchant, which may be effected through near field communications, Bluetooth, Bluetooth Low Energy (BLE), WiFi, radio, magnetic field emissions, infrared, or other short range wireless technology. The merchant may therefore perform payment processing using a received token, for example, by communicating the token with transaction information to a service provider, which may process a payment to the merchant using the token (e.g., through identification of the user's account, payment instrument, digital wallet, etc.). Additionally, the merchant may accept payment information for a payment instrument, payment, and/or token used in a transaction by scanning or otherwise entering a displayed code (e.g., alphanumeric, bar, image, and/or QR code) on a merchant device from the user's device. After transaction processing is complete, a transaction history (e.g., receipt) may be generated by the online service provider and communicated to one or more of the user's communication device and the merchant's device.

In various embodiments, prior to receiving the UUID for the transaction and payment request by the communication device, the communication device may also receive a second UUID (a location awareness ID) that notifies the user through the communication device that the merchant and/or merchant location accepts payments made through the online service provider. This allows the user to open the user's payment application and initialize a process to perform electronic payments with the merchant. For example, the user may opt-in to allow short range wireless communications from one or more merchant devices (e.g., through BLE and the merchant device and/or a corresponding wireless beacon at the merchant location). Once the merchant device is activated and an application for the online service provider is executed, the merchant device may begin broadcasting the second UUID. The second UUID may include information identifying the merchant/merchant location as accepting the online service provider. Thus, the user's communication device may alert the user that the online service provider is accepted for transactions with the merchant. An application executing on the communication device may wake the communication device, provide lock-screen notifications, vibrations, application badges, home screen notifications, application interfaces, or other type of alert to notify the user. In various embodiments, the second UUID may be transmitted over a second range, which may be larger than the first range for the first UUID or at a pre-set or maximum detectable range. Thus, the user's communication device may generally monitor for other UUIDs available where the UUIDs identify the location/merchant as accepting the service provider.

The aforementioned embodiments may also be utilized where the user may instead provide a UUID to the merchant device in order to perform payment processing. For example, after receiving the second UUID from the merchant device, the user may utilize the communication device to open or engage in a payment application and select that the user will utilize the online service provider for payment processing through the communication device. In such embodiments, the user may provide a token back to the merchant device, which may identify the user and/or a payment instrument or digital wallet. The merchant device may the perform payment processing using the token received from the user's communication device. In various embodiments, the merchant device may similarly range of a certain distance to find the user's broadcasted token by the communication device (e.g., over 1 foot), allowing only a nearby broadcast of the user's token to be used/detected so that extraneous tokens otherwise broadcasted are not used in the transaction. The token for the user may allow the merchant device to generate an online invoice, which may be transmitted to the user's communication device through a URL by the service provider as described above. The user may then review the funding source information and enter any other information (e.g., a tip amount), and may accept the transaction for processing in the invoice. The online service provider may then process a payment, as described herein.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a merchant device 120, and a service provider server 130, in communication over a network 150. A user (not shown) may utilize communication device 110 to receive one or more UUIDs at a merchant location corresponding to a merchant (not shown) for merchant device 120. The UUIDs may be broadcast by merchant device 120 for reception by communication device 110. For example, one UUID may correspond to a location awareness ID that identifies the merchant and/or merchant location as accepting electronic payment processes using merchant device 120 and through service provider server 130. Thus, communication device 110 may alert the user of acceptance of payment processes available using merchant device 120 and through service provider server 130. Additionally, a further UUID may correspond to a transaction between the user and the merchant at the merchant location. Communication device 110 may process the UUID to receive an online invoice for the transaction, and provide payment to the merchant using service provider server 130.

Communication device 110, merchant device 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with merchant device 120 and/or service provider server 130. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS 0), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a user service provider application 112, other applications 114, a database 116, and a communication module 118. User service provider application 112 and other applications 114 may correspond to executable processes, procedures, and/or applications with associated hardware. In other embodiments, communication device 110 may include additional or different modules having specialized hardware and/or software as required.

User service provider application 112 may correspond to one or more processes to execute modules and associated devices of communication device 110 to initiate, receive, and/or process/complete transactions using services provided by service provider server 130. In this regard, user service provider application 112 may correspond to specialized hardware and/or software utilized by communication device 110 to provide an interface to permit the user associated with communication device 110 to select payment options and provide payment for items, for example, to a merchant through merchant device 120 using service provider server 130. In various embodiments, user service provider application 112 may also provide payments and/or transfers to users and/or groups of users, for example, payments to individual sellers or friends for items and/or transfers between known associates. User service provider application 112 may be implemented as a user interface enabling the user to enter payment options for storage by communication device 110 (e.g., using a digital wallet), select and provide payment options on checkout/payment of one or more items with a merchant, and complete a transaction for the item(s) through a purchase request for the item(s). In various embodiments, user service provider application 112 may correspond to a general browser application configured to retrieve, present, and communicate information over the Internet (e.g., utilize resources on the World Wide Web) or a private network. For example, user service provider application 112 may provide a web browser, which may send and receive information over network 170, including retrieving website information, presenting the website information to the user, and/or communicating information to the website, including payment information. However, in other embodiments, user service provider application 112 may include a dedicated application of service provider server 130 or other entity (e.g., a merchant), which may be configured to assist in processing purchase requests. User service provider application 112 may be utilized to establish and/or maintain a user account and/or digital wallet with service provider server 130.

As discussed herein, user service provider application 112 may be utilized to alert a user of communication device 110 that a merchant corresponding to merchant device 120 accepts electronic payments through service provider server 130 (e.g., using user service provider application 112 of communication device 110 with user payment provider application 112). In this regard, user service provider application 112 may receive or detect a UUID, such as a location awareness ID, broadcast by merchant device 120 over a range, as discussed herein. The UUID may allow unique identification of merchant device 120 (and/or the merchant/merchant location for merchant device 120), as well as allow user service provider application 112 to determine that merchant device 120 accepts payment processes through service provider server 130. Using the UUID, user service provider application 112 may notify the user of communication device 110 that payment processes using service provider server 130 are accepted at the location where communication device 110 is receiving the UUID and/or with merchant device 120 broadcasting the UUID. For example, the UUID may identify the merchant and/or merchant device 120 as accepting service provider server 130 through a notification of user service provider application 112. User service provider application 112 may monitor for such UUIDs and alert the user when one of such UUIDs is received. Receipt of the UUID may cause user service provider application 112 to wake communication device 110 and/or activate a display device of communication device 110. A notification may further be output to the user by user service provider application 112, such as a lock-screen alert, banner, application badge, home screen message, application message, alarm, or other audio, visual, or audiovisual alert. In various embodiments, the UUID may also cause initialization and/or execution of user service provider application 112, which may include request of authentication credentials for the user to be input to user service provider application 112. Additionally, the UUID may cause user service provider application 112 to display merchant information for the merchant corresponding to merchant device 120 and/or query the user of whether the user wishes to utilize user service provider application 112 and service provider server 130 to process payments with merchant device 120. Where the user confirms that the user wishes to utilize user service provider application 112 and service provider server 130 to process payment with merchant device 120, user service provider application 112 may provide a token to merchant device 120.

For example, in certain embodiments, user service provider application 112 may communicate a token to merchant device 120 for payment processing. The token may correspond to some ID for the user corresponding to communication device 110, such as a name, email, address, digital wallet ID, payment instrument ID, or other token. The token may be used by merchant device 120 during transaction processing, as discussed herein. In such embodiments, user service provider application 112 may receive a URL for an online invoice from service provider server 130, and may retrieve the online invoice. User service provider application 112 may then display the online invoice to the user of communication device 110, and may allow the user to perform transaction processing, for example, by providing authentication and/or selecting a payment instrument to provide payment for the transaction in the online invoice.

However, in other embodiments, user service provider application 112 may instead perform transaction processing by receiving another broadcasted UUID, such as a payment terminal request ID. In such embodiments, the UUID from merchant device 120 for a payment request (e.g., originating from merchant device 120 as a payment terminal) may include a UUID having at least a portion randomized or unique to the UUID and identifying an online invoice with service provider server 130, as discussed herein. For example, a UUID transmitted from merchant device 120 using the iBeacon protocol may have a Major value and a Minor value each corresponding to a 3 digit number. The Major and Minor values may be randomized by merchant device 120 for each transaction, as discussed herein. In order to detect that the UUID is being transmitted to communication device 110 is for a transaction between the user of communication device 110 and the merchant of merchant device 120, user service provider application 112 may range for UUIDs and only process received UUIDs within a certain range. For example, a UUID within 12 inches or 30 centimeters may be assumed to correspond to a nearby merchant device that the user of communication device 110 would like to transaction with. User service provider application 112 may require the user to confirm that they are engaging in a transaction with the merchant/merchant device 120 identified in the transaction prior to processing of the UUID to receive an online invoice. Other closer or farther ranges may be utilized depending on the circumstances of the user, merchant, and/or transaction. For example, concession stands may require shorter ranges, while grocery stores may allow longer ranges corresponding to the proximity of other devices. Thus, user service provider application 112 may be configured depending on the circumstances of transactions and/or generally configured for a single range. The range may also have a lower limit cutoff to allow for mimicking a tap by bringing communication device 110 and merchant device 120 within close range. Thus, a very short range, such as 1 inch or centimeter may be used as a lower limit or another configuration, which may cause automatic processing of the UUID to retrieve an online invoice, as discussed herein.

User service provider application 112 may process the received UUID by transmitting the unique or randomized portion with a location to service provider server 130, where the location may be determined through the UUID and/or a location detection system of communication device 110. Service provider server 130 may respond to user service provider application 112 with a URL or other ID allowing user service provider application 112 to retrieve an online invoice for a transaction generated by merchant device 120 with service provider server 130. User service provider application 112 may then output the online invoice to the user of communication device 110 using one or more GUIs and one or more audio, visual, and/or audiovisual outputs of communication device 110. In other embodiments, another communication device may function as merchant device 120 transmitting the UUID, where the other communication device corresponds to another user requesting a payment or transfer through an online invoice.

User service provider application 112 may be utilized to enter or select payment instrument(s) for use with a transaction between the user and the merchant associated with merchant device 120 in an online invoice. For example, the user may wish to complete a transaction with a merchant to purchase one or more items through the online invoice. User service provider application 112 may utilize user financial information, such as a credit card, bank account, or other financial account, as a payment instrument when providing payment information for use in the authentication mechanism. In other embodiment, user service provider application 112 may provide a token that identifies the user, a digital wallet, and/or a payment instrument to merchant device 120 for use in transaction processing. Additionally, user service provider application 112 may utilize a user account with payment provider, such as service provider server 130, as the payment instrument. User service provider application 112 may be utilized to view the results of the transaction and/or for viewing and storage of a transaction history, such as a receipt.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking, online payments, money transfer, or other applications. Other applications 114 may also include other location detection applications, such as a mapping, compass, and/or GPS application, which may be used to determine a location for the user that is communicated to payment provider server 130 with at least a portion of the QUID. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, IDs such as operating system registry entries, cookies associated with user service provider application 112 and/or other applications 114, IDs associated with hardware of communication device 110, or other appropriate IDs, such as IDs used for payment/user/device authentication or identification. Database 116 may include location information and one or more UUIDs, which may be received from merchant device 120 and/or transmitted to service provider server 130.

Communication device 110 includes at least one communication module 118 adapted to communicate with merchant device 120 and/or service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant device 120 may be maintained, for example, by a merchant having a physical retail location where a user may purchase one or more items. In this regard, merchant device 120 may include a device having processing applications, which may be configured to interact with communication device 110 and/or service provider server 130 to engage in transactions, including over short range wireless communications with communication device 110 for exchange of one or more IDs. Merchant device 120 may be implemented using any appropriate hardware and software configured for wired and/or wireless communication with communication device 110 and/or service provider server 130. For example, in one embodiment, merchant device 120 may be implemented as a single or networked personal computer (PC), a smart phone, laptop computer, wearable computing device, and/or other types of computing devices at a merchant location capable of transmitting and/or receiving data. Although a merchant device is shown, the merchant device may be managed or controlled by any suitable processing device. Although only one merchant device is shown, a plurality of merchant devices may function similarly.

Merchant device 120 of FIG. 1 contains a merchant service provider application 122, other applications 124, a database 126, and a communication module 128. Merchant payment service application 122 and other applications 124 may correspond to processes, procedures, and/or applications executable by a hardware processor, for example, a software program. In other embodiments, merchant device 120 may include additional or different modules having specialized hardware and/or software as required.

Merchant service provider application 122 may correspond to one or more processes to execute modules and associated specialized hardware of merchant device 120 that provide checkout and payment processes for a transaction to purchase one or more items for sale from the merchant corresponding to merchant device 120. In this regard, merchant service provider application 122 may correspond to specialized hardware and/or software of merchant device 120 to provide a convenient interface to permit a merchant to enter, view, and/or edit items and/or services for purchase by a user. For example, merchant service provider application 122 may be implemented as an application having a user interface enabling the merchant to enter item information and request payment for a transaction on checkout/payment of one or more items/services. In certain embodiments, merchant service provider application 122 may correspond more generally to a web browser configured to view information available over the Internet or access a website corresponding to the merchant and/or service provider server 140. Thus, merchant service provider application 122 may provide item sales through an online marketplace using the website of the merchant. Merchant service provider application 122 may also alert users, such as consumers at a merchant location, of acceptance of payment using processes and features provided by service provider server 130. For example, on activation and/or execution of merchant service provider application 122, a UUID, such as a location awareness UUID, may begin being broadcast by merchant service provider application 122 using communication module 128 of merchant device 120. The UUID may be receivable over an area or range by communication devices (e.g., communication device 110) monitoring generally for UUIDs. The UUID may output a notification to the user of communication device 110 and/or cause a wake-up or activation of communication device 110 or an application of communication device 110 (e.g., user service provider application 112), as discussed herein.

In other embodiments, the merchant utilizing merchant device 120 may be required to specifically select that the UUID identifying the merchant as accepting payments through payment provider server 130 should be broadcast. For example, the merchant may select a broadcast button or may enter into a transaction processing (e.g., checkout and payment) interface of merchant service provider application 122.

Once a payment amount is determined for a transaction for items to be purchased by a user, merchant service provider application 122 may request payment from the user through the use of another UUID associated with the transaction, such as a payment terminal request ID corresponding to a specific transaction. In order to associated the UUID with a transaction, merchant service provider application 122 may determine a UUID having at least a unique or randomized portion of the UUID or associated with the UUID. In this regard, the portion may be randomized or made unique to the transaction by merchant service provider application 122. For example, using the iBeacon protocol, a UUID transmitted using BLE communications by merchant device 120 may include a Major value and a Minor value. In this regard, iBeacon may generally allow for specification of the Major value and the Minor value by merchant or other user. Thus, merchant service provider application 122 may be configured to randomize the Major and Minor values for a retrieved UUID (e.g., a payment terminal request UUID stored to database 126) for each transaction engaged in by the merchant with users using merchant service provider application 122. Once a portion of or associated with the UUID is made unique or randomized by merchant service provider application 122 for a transaction between the merchant of merchant device 120 and the user of communication device 110, merchant service provider application 122 may generate an invoice using service provider server 130.

In order to generate an online invoice accessible through a URL or other address/identifier allowing retrieval through a web browser and/or dedicated application (e.g., a URI opening data to a dedicated application, WebView® allowing display of web content through an Android® application, etc.), merchant service provider application 122 may communicate transaction information for the transaction with at least the unique or randomized portion for the UUID to service provider server 130. The transaction information may include a location for the merchant/merchant device 120, or the UUID or other data in the online invoice request may identify the location. Service provider server 130 may generate an online invoice, which may be identified through the unique/randomized portion and the location, as discussed herein. Merchant device 120 may then begin broadcasting the UUID having the unique/randomized portion, which may be received by communication device 110, as discussed herein. In various embodiments, the online invoice may also be displayed to the merchant through merchant service provider application 122, which may be monitored by the merchant/merchant service provider application 122 to view whether payment has been made by the user. Thus, the URL and/or identifier may be transmitted to merchant service provider application 122 for retrieval of the online invoice. However, in other embodiments, merchant service provider application 122 may only receive notification and/or a transaction history documenting payment for the transaction. Thus, merchant service provider application 122 may then receive the results of the transaction processing, and complete the transaction with the user, for example, by providing the user the items for the transaction or declining the transaction where the user is not authenticated or the transaction is not authorized (e.g., insufficient funds).

Merchant device 120 includes other applications 124 as may be desired in particular embodiments to provide features to merchant device 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. In various embodiments, other applications 124 may include financial applications, such as banking, online payments, money transfer, or other applications associated with payment provider server 130. Other applications 124 may contain software programs, executable by a processor, including a graphical user interface (GUI) configured to provide an interface to the user.

Merchant device 120 may further include database 126 which may include, for example, IDs such as operating system registry entries, cookies associated with merchant service provider application 122 and/or other applications 124, IDs associated with hardware of merchant device 120, or other appropriate IDs, such as IDs used for payment/user/device authentication or identification. IDs in database 126 may be used by a payment/credit provider, such as service provider server 130, to associate merchant device 120 with a particular account maintained by the payment/credit provider. Database 126 may further include transaction information and/or results. Additionally, merchant device 120 may include one or more UUIDs, as well as randomized/unique portions of UUIDs and their associated transactions. Thus, UUIDs stored to database 126 may be broadcast by merchant device 120.

Merchant device 120 includes at least one communication module 128 adapted to communicate with communication device 110 and/or payment provider server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online payment service provider, which may provide payment services and/or processing for financial transactions on behalf of users. In this regard, service provider server 130 includes one or more processing applications which may be configured to interact with communication device 110, merchant device 120, and/or another device/server to facilitate payment for a transaction, including establishment of payment accounts and configuration of mobile device applications to use an acceptance mechanism for electronic payments by a merchant. In one example, service provider server 130 may be provided by PAYPAL®, Inc. of San Jose, Calif., USA. However, in other embodiments, service provider server 130 may be maintained by or include a credit provider, financial services provider, financial data provider, and/or other service provider, which may provide payment services to the user.

Service provider server 130 of FIG. 1 includes invoicing application 140, a transaction processing application 132, other applications 134, a database 136, and a network interface component 138. Invoicing application 140, transaction processing application 132, and other applications 134 may correspond to executable processes, procedures, and/or applications with associated hardware. In other embodiments, service provider server 130 may include additional or different modules having specialized hardware and/or software as required.

Invoicing application 140 may correspond to one or more processes to execute modules and associated specialized hardware of service provider server 130 to receive transaction information for a transaction between the user of communication device 110 and the merchant of merchant device 120, and generate an online invoice for the transaction. In this regard, invoicing application 140 may correspond to specialized hardware and/or software to receive transaction information for the transaction from merchant device 120. The transaction information may be communicated with at least a portion of a UUID associated with the transaction by merchant device 120. The portion may be unique or randomized to correspond to that particular transaction that the portion is transmitted with to service provider server 130. Thus, the portion may identify the transaction when the UUID with the portion is transmitted. The transaction information and the portion may further be communicated to service provider server 130 by merchant device 120 with a location, or the location may be identifiable through the UUID and/or the transaction information. Invoicing application 140 may generate an online invoice, which may correspond to a webpage, database form/content, or other retrievable online resource having the transaction and a checkout/payment process. The online invoice may be generated to display the transaction information and include a payment process for service provider server 130 that processes a payment from the user of communication device 110 to the merchant of merchant device 120. The payment process may provide the payment through transaction processing application 132. The online invoice may be generated using the portion of the UUID and the location (e.g., a webpage may be generated having a URL specific to the portion and the location) or the online invoice data may be associated with the portion and the location so as to be retrievable using the portion of the UUID and the location. Once the online invoice is generated, invoicing application 140 may store the online invoice, for example, to database 136, for retrieval by communication device 110. Thus, when user service provider application 112 transmits the portions of the UUID (e.g., the randomized Major and Minor values) with the location, invoicing application 140 may look-up the online invoice through the received portion and location, and transmit the URL, invoicing for data, or other information to user service provider application 112. User service provider application 112 may then process a payment to the merchant of merchant device 120 using the online invoice through transaction processing application 132.

Transaction processing application 132 may correspond to one or more processes to execute modules and associated specialized hardware of service provider server 130 to receive and/or transmit information from communication device 110 for establishing payment accounts, as well as processing and completing of one or more transactions between the user of communication device 110 and the merchant of merchant device 120. In this regard, transaction processing application 132 may correspond to specialized hardware and/or software to establish payment accounts, which may be utilized to send and receive payments and monetary transfers and engage in other financial transactions. A user associated with communication device 110 may establish a payment account with transaction processing application 132 by providing personal and/or financial information to payment provider server 130 and selecting an account login, password, and other security information. The payment account may be used to send and receive payments. The payment account may be accessed and/or used through a browser application and/or dedicated payment application executed by communication device 110. A merchant associated with merchant device 120 may similarly establish and maintain a payment account through merchant device 120 using transaction processing application 132.

Transaction processing application 132 may receive a payment request from communication device 110 for a transaction between the user of communication device 110 and the merchant for merchant device 120, which may include IDs, tokens, or other data used for transaction processing. The payment request may be received from an online invoice generated by invoicing application 140 and communicated to communication device 110 for output to the user through user service provider application 112. In this regard, the payment request may be received from the payment process in the online invoice. Thus, the payment request may include transaction terms and a token, ID, authentication information, or other data necessary for the payment process in the online invoice on communication device 110. Transaction processing application 132 may provide payment to the merchant using the payment instrument provided or identified through the payment request and in the online invoice. After payment processing, transaction processing application 132 may provide a transaction history to communication device 110, merchant device 120, or store the history with one or more accounts of the user and/or merchant.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing service provider server 130. In various embodiments where not provided by transaction processing application 132, other applications 134 may include connection and/or communication applications, which may be utilized to communicate information to over network 150.

Additionally, service provider server 130 includes database 136. As previously discussed, the entity corresponding to merchant device 120 may establish one or more payment accounts with service provider server 130. Payment accounts in database 136 may include entity information, such as name, address, birthdate, payment/funding information, additional user financial information, and/or other desired user data. The entity may link to their respective payment accounts and/or digital wallets through an account, user, merchant, and/or device ID, as well as a generated token, which may be provided to communication device 110 and/or merchant device 120 for use. Thus, when an ID is transmitted to service provider server 130, e.g., from communication device 110 and/or merchant device 120, a payment account and/or digital wallet belonging to the entity may be found. Additionally, received transaction information, randomized/unique portions of a UUID and/or the full UUID, and a location may be stored to database 136, which may be further stored with a generated online invoice.

In various embodiments, service provider server 130 includes at least one network interface component 138 adapted to communicate communication device 110 and/or merchant device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
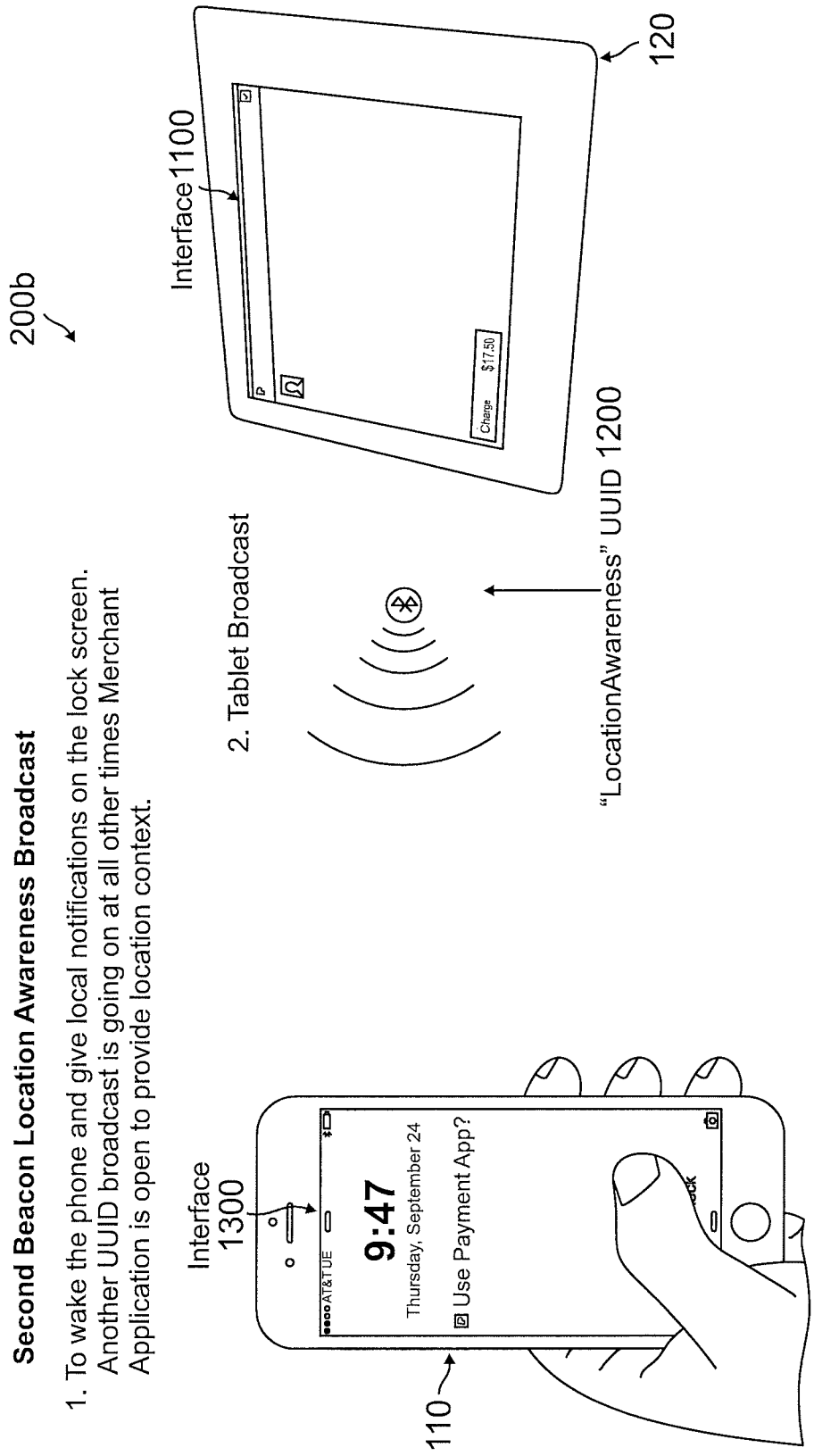
FIG. 2A is an exemplary consumer side experience when receiving a payment terminal request identifier on a communication device for a consumer, according to an embodiment.
FIG. 2B is an exemplary merchant and consumer experience for alerting a user of available payment processes through a consumer's communication device, according to an embodiment.

FIG. 2A is an exemplary consumer side experience when receiving a payment terminal request identifier on a communication device for a consumer, according to an embodiment. Environment 200a includes an interface 1000, and interface 1002, and an interface 1004 each corresponding generally to application interfaces of an application executing on a communication device, such as user service provider application 112 of communication device 110 in environment 100 of FIG. 1.

In environment 200a, step 1 shows an interface 100 after an application (e.g., user service provider application 112) executes on a communication device (e.g., communication device 110). In this regard, the application may execute to retrieve UUIDs used in payment processes, such as a payment terminal request ID that is associated with a transaction through a unique or randomized portion. Once the application opens and interface 100 displays, the application may begin ranging or searching for the UUID, such as the Payment Terminal UUID. The application may range using the iBeacon protocol, or other protocol, which may utilize short range wireless communications through BLE or other communication type. Thus, at step 2, if a beacon or device is found transmitting a UUID, the application may receive the UUID with the unique or randomized portion, such as a Major and Minor value randomized for a transaction.

Since the application is ranging for or otherwise detecting broadcast UUIDs, the application may further detect a transmission distance for the UUID, such as a distance between the communication device for interfaces 1000, 1002, and 1004 and a device transmitting or broadcasting the UUID. Thus, two determinations may be made at step 3a or step 3b. When ranging, if the application detects the UUID within a first range, shown as less than 2 but greater than 0.1 in step 3a, the application may query the user as shown in interface 1002. The query may inquire as to whether the user viewing interface 1002 is attempting to engage in a transaction with the merchant identified in the received UUID. However, in another embodiment shown in step 3a, if the UUID is detected as within 0.1, the application may instead skip the query shown in interface 1002. In such cases, the application may assume from the close proximity of the devices that the user is attempting to mimic a "tap" and has brought their communication device within close range to the merchant's device. Thus, the query may not be necessary.

After one of step 3a and 3b, the process may continue to step 4, where the application generates a tab for the location and retrieves a URL for an online invoice between the user and the merchant from a service provider. The URL may correspond to a WebView in an application, or may otherwise load to the communication device. The URL may be retrievable using the location of the UUID/communication device and the randomized or unique portion (e.g., the Major and Minor values received with the UUID). At step 5, the process may display the invoice (e.g., the transaction information) within the tab, where the user may complete a payment process using the forms, processes, and features available within the online invoice displayed in the tab.

FIG. 2B is an exemplary merchant and consumer experience for alerting a user of available payment processes through a consumer's communication device, according to an embodiment. In various embodiments, the process displayed in environment 200b may occur prior to the process of environment 200a in FIG. 2A in order to alert a user that the user may utilize their communication device to receive a UUID and perform transaction processing with a merchant. Thus, environment 200b includes a communication device 110 and merchant device 120 corresponding generally to communication device 110 and merchant device 120 in environment 100 of FIG. 1.

In environment 200b, a different UUID may be broadcast by merchant device 120, for example, when a merchant application (e.g., merchant payment provider application 122 of merchant device 120 in environment 100 of FIG. 1) is executing on merchant device 120, or at other times, such as on request of a merchant using the application or when a specific process/interface is executing/open. Thus, at step 1, in order to wake a phone or other device (e.g., communication device 110) and/or present a lock screen notification, a UUID (e.g., a location awareness ID) is retrieved that alerts a device that merchant device 120 performs payment processing through an online payment provider. Interface 1100 of merchant device 120 is open, which causes broadcast of UUID 1200 that includes a "location awareness" feature to wake communication device 110. Thus, at step 2, UUID 1200 is broadcast and received by communication device 110. Based on the receipt of UUID 1200, interface 1300 displays on communication device 110 that includes a lock screen alert to notify a user of use of payment processes with merchant device 120.

Figure 3:
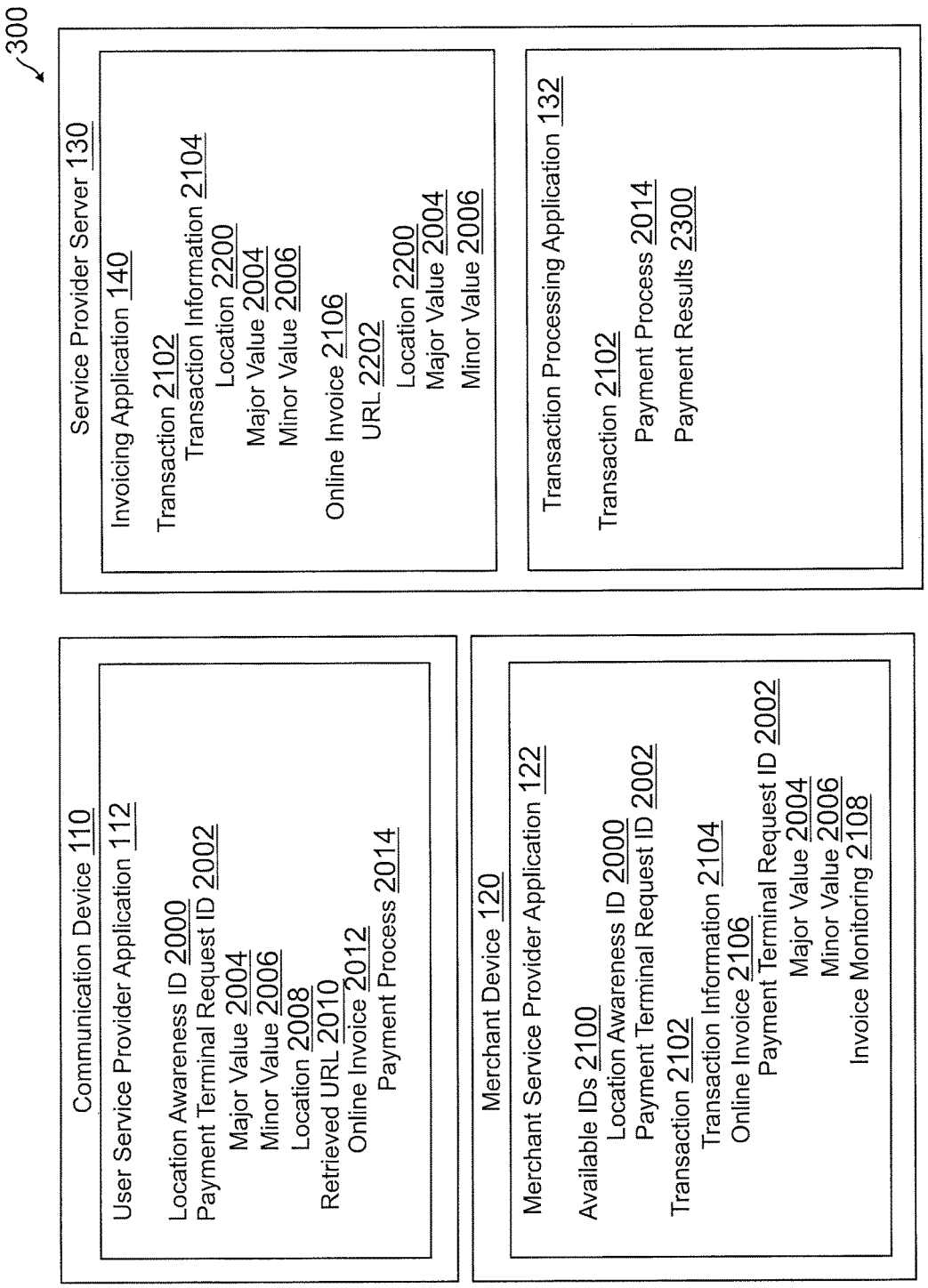
FIG. 3 is an exemplary system environment having a communication device interacting with a merchant device to receive localized identifier broadcasts and process an online invoice, according to an embodiment.

FIG. 3 is an exemplary system environment having a communication device interacting with a merchant device to receive localized identifier broadcasts and process an online invoice, according to an embodiment. Environment 300 of FIG. 3 includes a communication device 110, a merchant device 120, and a payment provider server 130 corresponding generally to described devices and associated features found in system 100 of FIG. 1.

Merchant device 120 executes a merchant service provider application 122 corresponding generally to the specialized hardware and/or software modules and processes described in reference to FIG. 1. In this regard, merchant service provider application 122 may execute to provide sales, checkout, and payment processes to a merchant of merchant device 120. In order to alert users of the availability of payment processing with merchant device 120 using service provider server 130, merchant service provider application 122 may access available IDs 2100 to retrieve and broadcast a location awareness ID 2000, which may correspond to a UUID identifying the merchant as accepting payment processes through service provider server 130.

Additionally, merchant service provider application 122 may receive input corresponding to a transaction 2102, which may include transaction information 2104. In order to perform transaction processing of transaction 2012, merchant service provider application 122 may retrieve payment terminal request ID 2002 for transaction 2102, which may correspond to a UUID having a unique or randomize element or portion associated with transaction 2102 specifically. Merchant service provider application 122 may provide a location with the unique/randomized element or portion to service provider server 130 for generation of online invoice 2106. Online invoice 2106 may be associated with payment terminal request ID 2002 having a randomized or unique Major value 2004 and Minor value 2006. Additionally, merchant service provider application 122 may perform invoice monitoring 2108 of transaction 2102.

Service provider server 130 executes an invoicing application 140 corresponding generally to the specialized hardware and/or software modules and processes described in reference to FIG. 1. In this regard, invoicing application 140 may generate online invoice 2106 from transaction 2102 receiving from merchant device 120. For example, transaction 2102 includes transaction information 2104, which includes a location 2200 for the merchant, merchant device 120, and/or transaction 2102. Additionally, transaction 2102 includes information for a UUID, such as a randomized/unique portion. Thus, receiving information for transaction 2102 includes at least Major value 2004 and Minor value 2006 for payment terminal request ID 2002. Using the aforementioned information, online invoice 2106 is generated, which may be identified through an URL 2202 generated or identifiable through location 2200, Major value 2004, and Minor value 2006.

Communication device 110 executes a user service provider application 112 corresponding generally to the specialized hardware and/or software modules and processes described in reference to FIG. 1. In this regard, user service provider application 112 may receive one or more identifiers to alert a user of available payment processes and perform payment processing. For example, location awareness ID 2000 may be received and cause an alert to be generated for display to the user of communication device 110 that certain payment processes are available with a merchant. Once payment processing for a transaction is requested by merchant device 120, payment terminal request ID 2002 may be received having Major value 2004 and Minor value 2006, as well as location 2008 determined through payment terminal request ID 2002 and/or a location detection device of communication device 110. Using payment terminal request ID 2002, a retrieved URL 2010 may cause display of online invoice 2012, which may include a payment process 2014 for providing a payment to the merchant.

In order to process the payment, service provider server 130 further executes a transaction processing application 132 corresponding generally to the specialized hardware and/or software modules and processes described in reference to FIG. 1. In this regard, transaction processing application 132 may include information for transaction 2102 in order to provide payment processing. Using payment process 2014 for the online invoice, the payment may be processed. Additionally, payment results 2300 may be determined and provided to one or more of communication device 110 and merchant device 120.

Figure 4A:
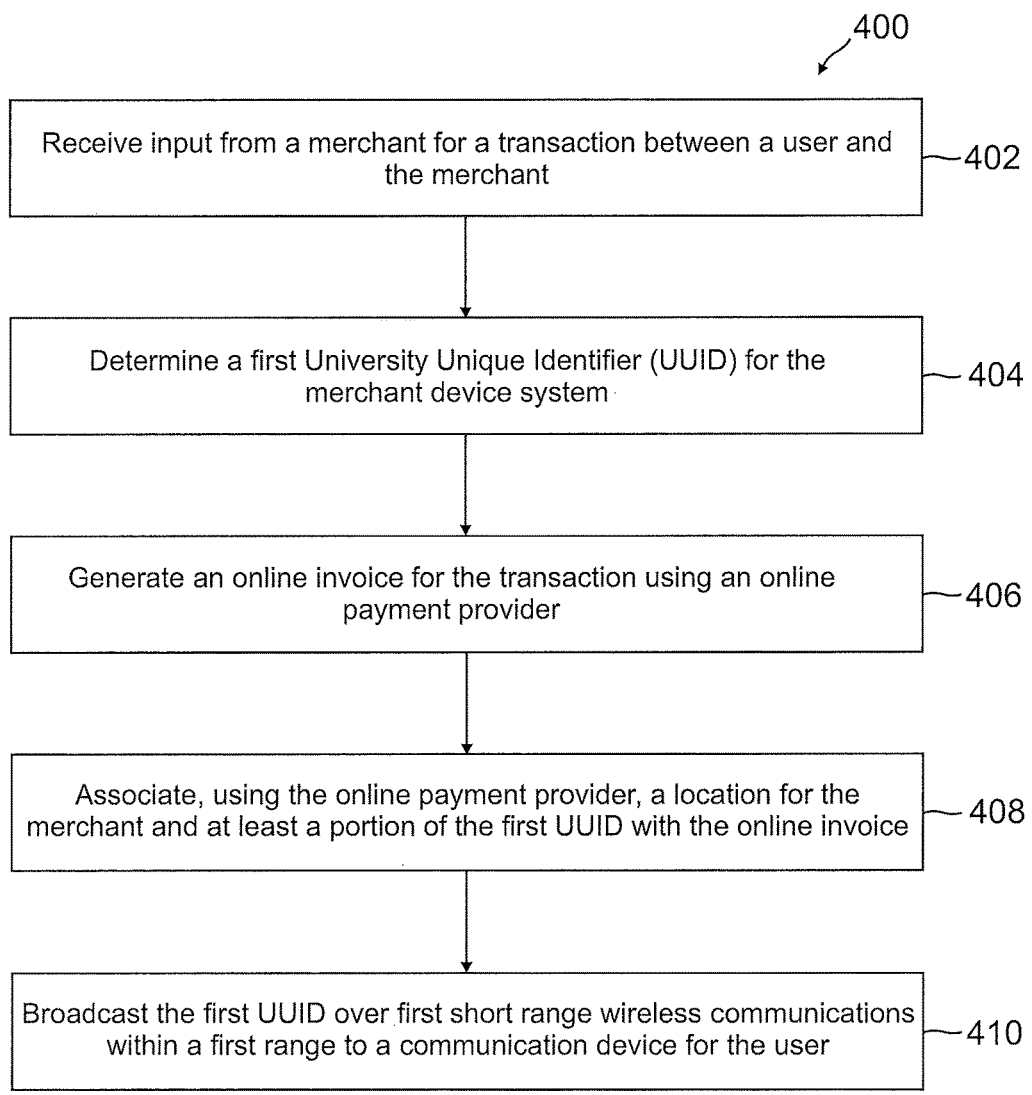
FIG. 4A is an exemplary process flowchart for localized identifier broadcasts to alert users of available processes and retrieve online server data using a merchant device, according to an embodiment.

FIG. 4A is an exemplary process flowchart for localized identifier broadcasts to alert users of available processes and retrieve online server data using a merchant device, according to an embodiment. Note that one or more steps, processes, and methods described herein may be omitted, performed in a different sequence, or combined as desired or appropriate.

At step 402, input from a merchant for a transaction between a user and the merchant is received. A first Universally Unique Identifier (UUID) for the merchant device system is determined, at step 404. The first UUID may comprises a payment terminal request identifier identifying the merchant device system as a payment terminal for transaction processing to at least one communication device receiving the payment terminal request identifier. Thus, determining the first UUID may comprise retrieving the payment terminal request identifier for the merchant device system and generating a unique Major value and a unique Minor value for the payment terminal request identifier using iBeacon protocol. In other embodiments, determining the payment terminal request identifier may comprise retrieving the payment terminal request identifier for the merchant device system and generating at least one unique portion for the payment terminal request identifier.

At step 406, an online invoice for the transaction is generated using an online payment provider. The online invoice may associated with a Uniform Resource Locator (URL) by the online service provider, wherein accessing the URL by a communication device retrieves the online invoice in an application of the communication device. At step 408, using the online service provider, a location for the merchant and at least a portion of the first UUID is associated with the online invoice. Associating the at least a portion of the payment terminal request identifier with the online invoice may comprise associating the unique Major value and the unique Minor value with the online invoice. In other embodiments, associating the at least a portion of the payment terminal request identifier with the online invoice may comprise associating the at least one unique portion with the online invoice.

The first UUID is broadcasted over first short range wireless communications within a first range to a communication device for the user, at step 410. The first short range wireless communications may comprise Bluetooth Low Energy (BLE) communications. The communication device for the user may receive the payment terminal request identifier, wherein an application executing on the communication device retrieves the online invoice using the unique Major value, the unique Minor value, and the location. The application of the communication device may range for all BLE communications available to the communication device and all connection distances for the all BLE communications, wherein the communication device selects the BLE communications for the first UUID based on the all BLE communications and the all connection distances. For example, the application selects the BLE communications for the first UUID based on a pre-set maximum distance for a connection distance of the BLE communications.

In certain embodiment, prior to receiving the input for the transaction, a second UUID comprising identification of the merchant as accepting the online service provider may be retrieved and the second UUID may be broadcasted over a second short range wireless communications within a second range to the communication device for the user, wherein the second range is larger than the first range. Thus, the communication device for the user may receive the second UUID and notifies the user that the merchant accepts the online service provider.

Figure 4B:
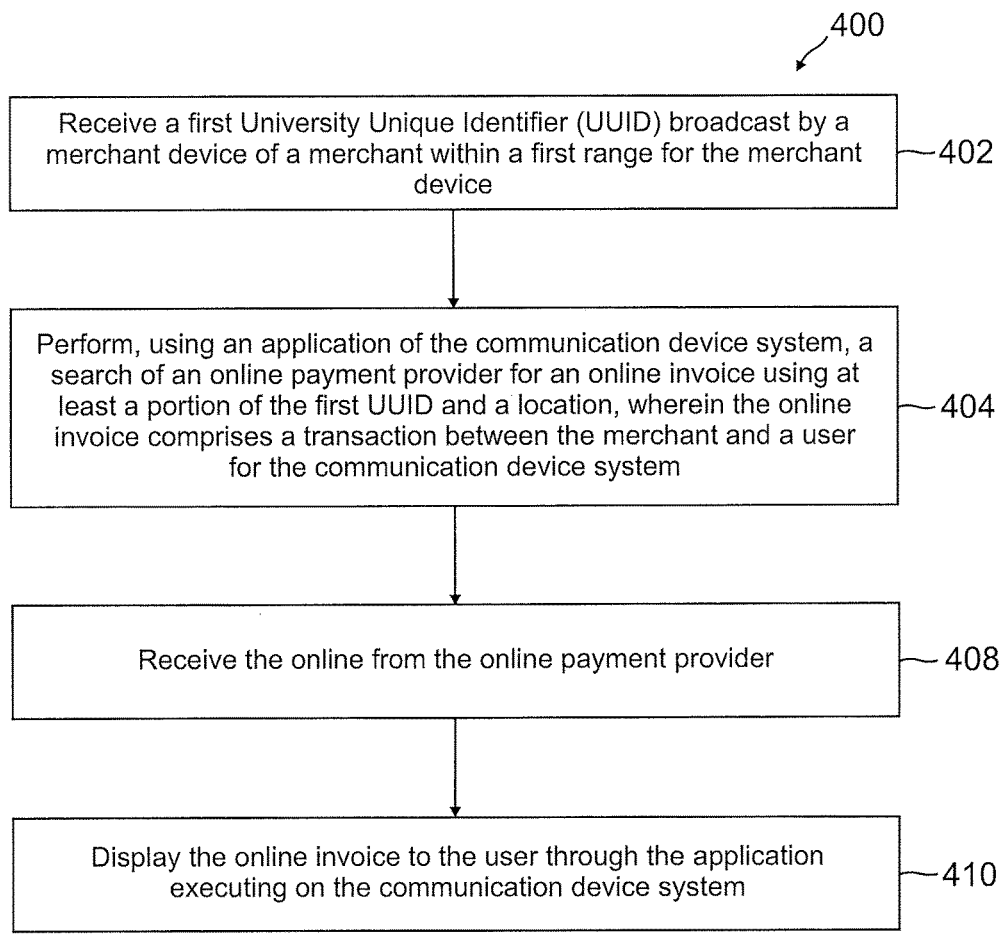
FIG. 4B is an exemplary process flowchart for localized identifier broadcasts to alert users of available processes and retrieve online server data through a communication device for a user, according to an embodiment.

FIG. 4B is an exemplary process flowchart for localized identifier broadcasts to alert users of available processes and retrieve online server data through a communication device for a user, according to an embodiment. Note that one or more steps, processes, and methods described herein may be omitted, performed in a different sequence, or combined as desired or appropriate.

At step 402, a first Universally Unique Identifier (UUID) broadcast by a merchant device of a merchant within a first range for the merchant device is received. Using an application of the communication device system, a search of an online service provider for an online invoice using at least a portion of the first UUID and a location is performed, wherein the online invoice comprises a transaction between the merchant and a user for the communication device system, at step 404. The at least the portion of the UUID comprises a randomized Major value and a randomized Minor value attached to the UUID using iBeacon protocol. A search application programming interface (API) for the online service provider may limit the search for the online invoice to one of a merchant location for the merchant and a set distance associated with the merchant.

At step 406, the online from the online service provider is received. The online invoice is displayed to the user through the application executing on the communication device system, at step 408. In various embodiments, the communication device system may cause to be opened and executed the application upon receiving the first UUID, display the at least the portion of the first UUID and the location in the application, and receive user confirmation to perform the search using the application. In certain embodiments, prior to receiving the first UUID, a second UUID broadcast by the merchant device within a second range for the merchant device may be received, wherein the second range is larger than the first range, and wherein the second UUID alerts the user of an availability of the online service provider with the merchant, and the user may be alerted of the availability of the online service provider with the merchant.

Figure 5:
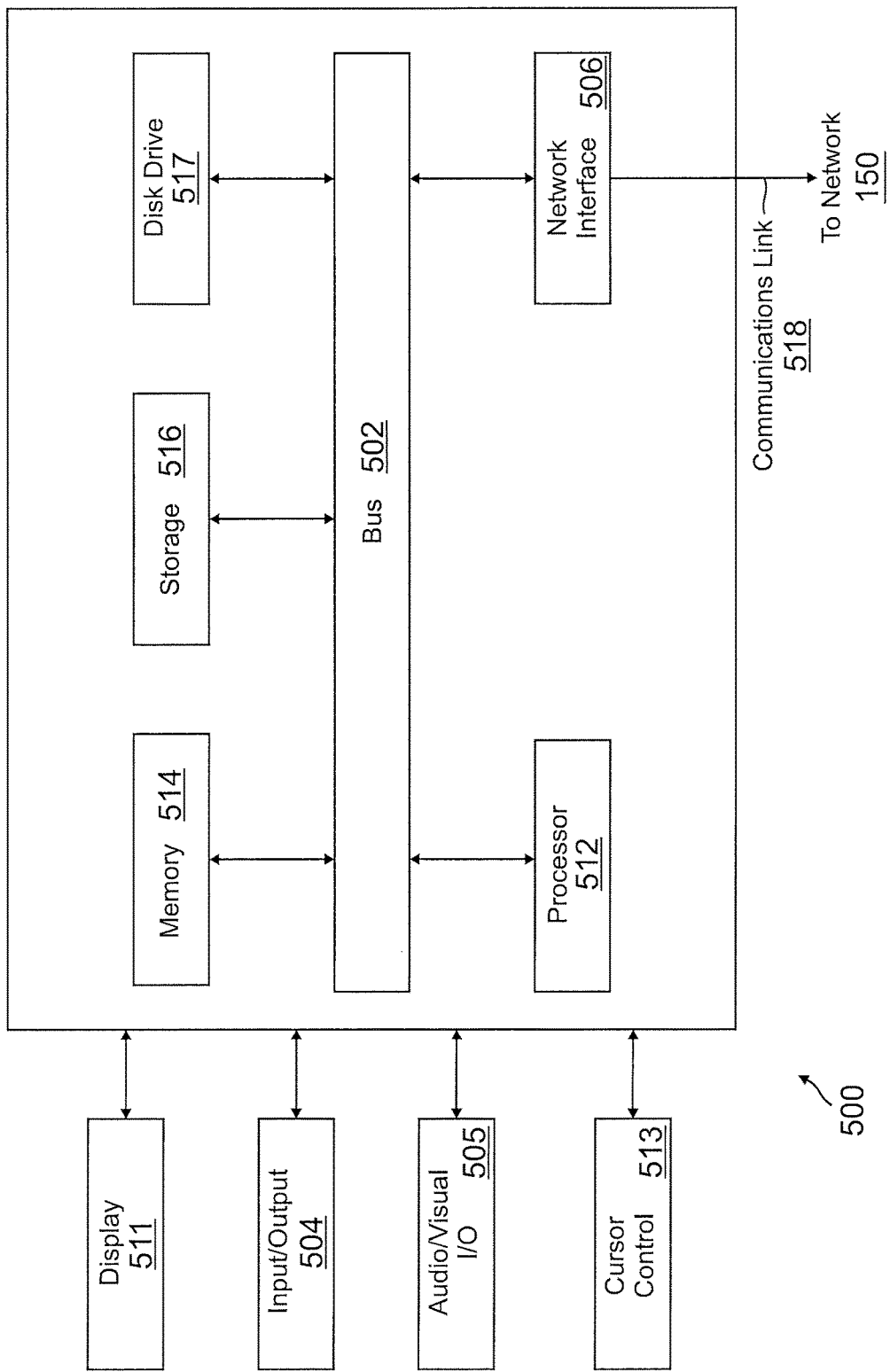
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A merchant device system comprising:
   a non-transitory memory; and
   one or more hardware processors coupled to the non-transitory memory and configured to read instructions from the non-transitory memory to cause the merchant device system to perform operations comprising:
   receiving input from a merchant for a transaction between a user and the merchant;
   determining a first Universally Unique Identifier (UUID) for the merchant device system;
   determining a portion of the first UUID specific to the transaction, wherein the portion comprises an alphanumeric value within the first UUID, wherein the portion uniquely identifies the transaction with the merchant device system using the alphanumeric value;
   generating, through an online service provider, data comprising an online invoice for the transaction;
   determining a network address for retrieval of the data using the portion of the first UUID;
   storing a location for the merchant and the network address with the data in a database of the online service provider; and
   broadcasting the first UUID having the portion over first short range wireless communications within a first range to a communication device of the user.

2. The merchant device system of claim 1, wherein the network address comprises a Uniform Resource Locator (URL) associated with the online service provider.

3. The merchant device system of claim 1, wherein the first UUID comprises a payment terminal request identifier identifying the merchant device system as a payment terminal for transaction processing to the communication device.

4. The merchant device system of claim 3, wherein the first short range wireless communications comprise Bluetooth Low Energy (BLE) communications.

5. The merchant device system of claim 4, wherein the determining the first UUID comprises retrieving the payment terminal request identifier associated with the merchant device system, wherein the determining the portion comprises generating a unique Major value and a unique Minor value for the payment terminal request identifier using an iBeacon protocol.

6. The merchant device system of claim 4, wherein the first short range wireless communications comprise a pre-set maximum distance for a connection distance of the BLE communications.

7. The merchant device system of claim 5, wherein the generating the network address uses the unique Major value and the unique Minor value.

8. The merchant device system of claim 1, wherein prior to receiving the input from the merchant, the operations further comprise:
   retrieving a second UUID comprising an identification of the merchant as accepting the online service provider; and
   broadcasting the second UUID over a second short range wireless communications within a second range to the communication device of the user, wherein the second range is larger than the first range.

9. The merchant device system of claim 8, wherein the second UUID further comprises a process to execute an application on the communication device and notify the user of the identification that the merchant accepts the online service provider.

10. The merchant device system of claim 1, wherein the first range for the first short range wireless communications comprises a physical tap range between the merchant device system and the communication device.

11. A method comprising:
    receiving, by a merchant device, input from a merchant for a transaction between a user and the merchant;
    determining a first Universally Unique Identifier (UUID) for the merchant device;
    randomizing a portion of the first UUID, wherein the randomized portion uniquely identifies the transaction;
    generating, through an online service provider, an online invoice for the transaction;
    storing a location for the merchant and a network address associated with the randomized portion of the first UUID with the online invoice in a database of the online service provider; and
    broadcasting the first UUID having the randomized portion over short range wireless communications within a first range to a communication device for the user.

12. The method of claim 11, wherein the determining the first UUID comprises retrieving a payment terminal request identifier associated with the merchant device, wherein the randomizing the portion comprises generating a unique Major value and a unique Minor value for the payment terminal request identifier using an iBeacon protocol.

13. The method of claim 11, further comprising:
retrieving a second UUID comprising identification of the merchant as accepting the online service provider; and
broadcasting the second UUID over a second short range wireless communications within a second range to the communication device for the user, wherein the second range is larger than the first range.

14. The method of claim 11, wherein the first range for the short range wireless communications comprises a physical tap range between the merchant device and the communication device.

15. A communication device system comprising:
a non-transitory memory; and
one or more hardware processors coupled to the non-transitory memory and configured to read instructions from the non-transitory memory to cause the communication device system to perform operations comprising:
receiving a first Universally Unique Identifier (UUID) broadcast by a merchant device of a merchant within a first range for the merchant device, wherein the first UUID comprises a portion of the first UUID that uniquely identifies a transaction between the merchant and a user for the communication device system;
performing, using an application of the communication device system, a search of an online service provider for a network address for an online invoice using the portion of the first UUID and a location associated with the merchant, wherein the online invoice is associated with the transaction;
determining the network address for retrieval of data comprising the online invoice based on the performing the search;
in response to the determining the network address, determining the data comprising the online invoice from the online service provider using the network address; and
loading the data for the online invoice to a user interface of the application executing on the communication device system.

16. The communication device system of claim 15, wherein prior to performing the search, the operations further comprise:
causing to be opened and executed, the application on the receiving the first UUID;
displaying the portion of the first UUID and the location in the application; and
receiving user confirmation to perform the search using the application.

17. The communication device system of claim 16, wherein the portion of the first UUID comprises a randomized Major value and a randomized Minor value, and wherein the first UUID uses an iBeacon protocol.

18. The communication device system of claim 15, wherein a search application programming interface (API) for the online service provider limits the search for the online invoice to one of the location for the merchant or a set distance associated with the merchant.

19. The communication device system of claim 15, wherein prior to receiving the first UUID, the operations further comprise:
receiving a second UUID broadcasted by the merchant device within a second range for the merchant device, wherein the second range is larger than the first range, and wherein the second UUID alerts the user of an availability of the online service provider with the merchant; and
alerting the user of the availability of the online service provider with the merchant.

20. The communication device system of claim 15, wherein the determining the data comprises opening a web link based on the network address.

* * * * *